United States Patent
Khatake et al.

(10) Patent No.: US 12,091,496 B2
(45) Date of Patent: *Sep. 17, 2024

(54) MODIFIED PHENALKAMINE CURING AGENT FOR EPOXY RESIN COMPOSITION AND USE THEREOF

(71) Applicants: ELANTAS BECK INDIA LTD., Pimpri (IN); ELANTAS GMBH, Wesel (DE)

(72) Inventors: Singuribu Machindra Khatake, Pune (IN); Sunil Narsingrao Garaje, Pune (IN); Shashikant Sangmeshwar Paymalle, Pune (IN); Vinayak Anant Bhanu, Pune (IN)

(73) Assignee: ELANTAS BECK INDIA LTD., Pimpri (IN)

( * ) Notice: Subject to any disclaimer, the term of this patent is extended or adjusted under 35 U.S.C. 154(b) by 125 days.

This patent is subject to a terminal disclaimer.

(21) Appl. No.: 17/049,361

(22) PCT Filed: Apr. 25, 2019

(86) PCT No.: PCT/EP2019/060690
§ 371 (c)(1),
(2) Date: Oct. 21, 2020

(87) PCT Pub. No.: WO2019/207079
PCT Pub. Date: Oct. 31, 2019

(65) Prior Publication Data
US 2021/0324135 A1    Oct. 21, 2021

(30) Foreign Application Priority Data
Apr. 26, 2018  (EP) .................................. 18169654

(51) Int. Cl.
*C08G 59/62*   (2006.01)
*C08K 5/00*    (2006.01)
*C08L 63/00*   (2006.01)

(52) U.S. Cl.
CPC .......... *C08G 59/623* (2013.01); *C08K 5/0041* (2013.01); *C08L 63/00* (2013.01)

(58) Field of Classification Search
CPC ...... C08G 59/623; C08K 5/0041; C08L 63/00
USPC ....................................................... 525/481
See application file for complete search history.

(56) References Cited

U.S. PATENT DOCUMENTS

| | | |
|---|---|---|
| 3,864,426 A | 2/1975 | Salensky |
| 4,101,459 A | 7/1978 | Andrews |
| 4,116,938 A | 9/1978 | Schulze et al. |
| 4,122,068 A | 10/1978 | Meyer |
| 4,164,520 A | 8/1979 | Klein et al. |
| 4,331,582 A | 5/1982 | Babayan |
| 4,500,691 A | 2/1985 | Stockinger et al. |
| 4,837,295 A | 6/1989 | Drain et al. |
| 5,541,000 A | 7/1996 | Hardy et al. |
| 6,229,054 B1 | 5/2001 | Dai et al. |
| 6,248,204 B1 | 6/2001 | Schuft |
| 6,262,148 B1 | 7/2001 | Cheng et al. |
| 6,846,868 B2 | 1/2005 | Oka et al. |
| 6,911,109 B2 | 6/2005 | Giroux et al. |
| 7,550,550 B2 | 6/2009 | Klein et al. |
| 8,293,132 B2 | 10/2012 | Sato et al. |
| 8,822,629 B2 | 9/2014 | Hwang et al. |
| 2010/0048827 A1 | 2/2010 | Walker et al. |
| 2012/0165466 A1 | 6/2012 | Nitto et al. |
| 2012/0177937 A1 | 7/2012 | Ogawa et al. |
| 2014/0275343 A1* | 9/2014 | Hefner, Jr. ............. C08G 59/24 523/427 |
| 2015/0094400 A1* | 4/2015 | Zheng ..................... C08L 63/00 252/182.13 |
| 2015/0284608 A1 | 10/2015 | Hofstetter |
| 2016/0215142 A1* | 7/2016 | Zhang ................... C08L 95/005 |
| 2017/0240691 A1 | 8/2017 | Zheng et al. |

FOREIGN PATENT DOCUMENTS

| | | |
|---|---|---|
| EP | 0501064 A2 | 9/1992 |
| EP | 1091926 A1 | 4/2001 |
| EP | 2123689 A1 | 11/2009 |
| WO | 2012082727 A1 | 6/2012 |
| WO | 2014067095 A1 | 5/2014 |

OTHER PUBLICATIONS

International Search Report and Written Opinion for International Application No. PCT/EP2019/060690 mailed May 15, 2019 (11 pages).
D. Balgude et al., "Synthesis and characterization of cardanol based reactive polyamidefor epoxy coating application," Progress in Organic Coatings, Elsevier BV, vol. 104 (2016) pp. 250-262.
Z. Ma et al., "Synthesis, curing kinetics, mechanical and thermal properties of novel cardanol-based curing agents with thiourea," RSC Adv., vol. 6, No. 107 (2016) pp. 105744-105754.
Yang Liu et al., "Synthesis and Curing Kinetics of Cardanol-Based Curing Agents for Epoxy Resin by In Situ Depolymerization of Paraformaldehyde," Journal of Polymer Science, Part A: Polymer Chemistry, 2014, 52, pp. 472-480.
Alessandro Gandini, "The irruption of polymers from renewable resources on the scene of macromolecular science and technology," Green Chem., 2011, 13, pp. 1061-1083.

(Continued)

*Primary Examiner* — David T Karst
(74) *Attorney, Agent, or Firm* — Fitch, Even, Tabin & Flannery LLP

(57) ABSTRACT

The present invention relates to new compounds based on polyetheramine modified phenalkamine, their use as curing agents, compositions comprising the novel compounds, the manufacture of such compounds and of such compositions, and the use of these compositions, in particular in a potting process in electrical and electronic components and devices.

15 Claims, No Drawings

(56) References Cited

OTHER PUBLICATIONS

Emilie Darroman et al., "New aromatic amine based on cardanol giving new biobased epoxy networks with cardanol," Eur. J. Lipid Sci. Technol. 2015, 117, pp. 178-189.
X.-D. Fan et al., "Synthesis and Characterization of Ployamide Resins from Soy-Based Dimer Acids and Different Amides," Journal of Applied Polymer Science, vol. 68, Issue 2, pp. 305-314, 1998, Wiley Periodicals, Inc.
Francis Pardal et al., "Unsaturated Polyamides from Bio-Based Z-octadec-9-enedioic Acid," Macromolecular Chemistry and Physics, vol. 209, Issue 1, pp. 64-74, 2008, John Wiley & Sons, Ltd.
Lucrezia Martino et al., "Bio-based polyamide 11: Synthesis, rheology and solid-state properties of star structures," European Polymer Journal, vol. 59, pp. 69-77, 2014, Elsevier Ltd.

\* cited by examiner

MODIFIED PHENALKAMINE CURING AGENT FOR EPOXY RESIN COMPOSITION AND USE THEREOF

The present invention relates to new compounds based on polyetheramine modified phenalkamine, their use as curing agents, compositions comprising the novel compounds, the manufacture of such compounds and of such compositions, and the use of these compositions, in particular in a potting process in electrical and electronic components and devices.

Epoxy resins are extensively used in many industrial applications like coating, adhesive, electrical insulation, electronics encapsulation due to their excellent adhesive properties, chemical resistance, good mechanical and physical properties.

Final properties of cured material based on epoxy resin also depend on the type of curing agent used for crosslinking the epoxy resin to form thermoset.

Conventional curing agents for epoxy resin are based on amines, such as ethylenediamine, diethylenetriamine (DETA), triethylenetetramine (TETA) or tetraethylenepentamine (TEPA). Unfortunately these kind of curing agents are toxic, irritating, volatile and moisture sensitive in nature and therefore their applications are restricted. (Journal of Polymer Science, Part A: Polymer Chemistry, Vol. 52, pp, 472-480, [2014], Wiley Periodicals, Inc.).

As an alternative to amines, phenalkamines are widely used as curing agents in epoxy resin compositions and can be obtained in a Mannich reaction for example reacting bisphenol and/or cardanol with aldehyde such as formaldehyde and polyamine, as described for example in U.S. Pat. No. 6,262,148B1, US20100048827A1 and Liu et at. (Journal of Polymer Science, Part A: Polymer Chemistry, Vol. 52, pp, 472-480, [2014], Wiley Periodicals, Inc).

In view of the increasing demand of the last few years for bio-based polymer due to environmental concerns (Green Chemistry, Vol. 13, pp 1061-1083, [2011], Royal Society of Chemistry), more attention was given to renewable resources derived thermosetting materials, particularly for epoxy thermosets. Until now, only bio-based aromatic acids or anhydrides are used as epoxy curing agents and only few bio-based diamines are already industrially available but most of them are poorly soluble in most of solvents or produce harmful byproduct.

Cardanol has the additional advantage that it is extracted from cashew nut shell liquid (CNSL) readily separated from other impurities by using vacuum distillation methods (RSC Advances, Vol. 6, pp 105744-105754, [2016], Royal Society of Chemistry). As a source of cardanol, CNSL is sustainable, low cost and largely available natural resource obtained as a byproduct of cashew processing industry. It is also non-edible byproduct of CNSL industries. Accordingly, cardanol is a promising aromatic renewable source available in large quantity (European Journal of Lipid Science and Technology, Vol. 117, pp 178-189, [2015], WILEY-VCH Verlag GmbH & Co. KGaA, Weinheim). According to U.S. Pat. No. 6,229,054B1, CNSL derivatives have many industrial uses as, for example, epoxy curing agents, phenolic resins, surfactants, and emulsion breakers.

WO 2014/067095 A1 describes blending of phenalkamine with styrenated phenol or styrenated phenol novolac compound to form a curing agent composition for an epoxy compound. U.S. Pat. No. 8,293,132B2 discloses phenalkamine blended with a salted polyamine or a salted polyamine-epoxy adduct to form a curing agent for an epoxy resin. In addition, there are few published articles related to the modification of phenalkamine for tuning the physical properties of final cured product with epoxy resin. In such study, phenalkamine based curing agents is modified with cross-linkable thiourea groups (RSC Advances, Vol. 6, pp 105744-105754, [2016], Royal Society of Chemistry).

Further curing agents are polyetheramines as described for example in US 20050234216 A1 and US 755055062. This kind of curing agents help to improve flexibility and lengthen the working time for the preparation of thermoset for epoxy resin systems.

Additional polyetheramines, such as oxyethylene diamines, oxyethylene triamines, polyoxyethylene diamines etc., can be used as curing agents for epoxy resin system as described in U.S. Pat. No. 6,248,204B1 and U.S. Pat. No. 6,911,109B2.

Overall, phenalkamine have a number of advantages such as low toxicity, low viscosity, low reactivity, water resistance etc. as compared to the other aliphatic and aromatic amine based curing agents (U.S. Pat. No. 6,262,148B1, US 755055062). Additionally, phenolic hydroxyl group present in the phenalkamine helps for low temperature curing phenomenon with epoxy resin. For this reason, phenalkamine are able to react with epoxy resin at room temperature and form thermoset materials. However, unmodified phenalkamine have disadvantage that in cured epoxy materials they provide a very dark color to the cured material. For this reason, the application of phenalkamine in epoxy resin is very limited (RSC Advances, Vol. 6, pp 105744-105754, [2016], Royal Society of Chemistry).

New type of electronics applications use several small parts made by casting/potting type thermosetting systems. For simplifying the assembling on large scale of such systems the small parts are often manufactured in different color for their quick identification. US 2017/0240691 discloses epoxy-amine compositions and curing agents comprising a benzylated Mannich base composition. The coatings obtained in this document are classified as being clear or hazy. However, not necessarily a clear material is also colorable. In fact, a dark or very dark material is less suitable to be colored as a bright material.

Accordingly, there is the need to provide new compounds to be used as curing agents able to provide a colorable cured material.

Furthermore, in the new generation electronics application, controlling the peak exotherm temperature during crosslinking of an amino reactive resin, preferably an epoxy resin and hardener is very critical. High peak exotherm temperature may lead to damage the sensitive parts of component.

Generally accelerators, such as phenols, imidazoles, boronfluoride-amine complex, metal fluoroborate such as zinc fluoroborate and copper fluoroborate and triphenyl phosphite, are used in epoxy system for increasing the rate of reaction between the resin and hardener. Further examples of accelerators of epoxy systems are salts of trifluoromethanesulfonic acid, described in U.S. Pat. No. 4,101,459, and half salt of an imidazole and a strong aromatic sulfonic acid as a catalyst as mentioned in U.S. Pat. No. 4,331,582. In U.S. Pat. No. 5,541,000 it is described the use of quaternized iminothioethers, and aromatic cations as an accelerator along with epoxy resin and curing agent for obtaining low peak exotherm temperature epoxy system.

All these accelerators used in above patents are added to the resin and curing agent system. It is desirable to have hardener molecules that have inbuilt accelerating property, which allow the curing reaction to start and proceed, and simultaneously with the ability to control such reaction in terms of peak exotherm temperature, i.e., to have resin and hardener systems for which there is no need of adding accelerators.

In modern electrical and electronics industry, an amino reactive resin, preferably an epoxy resins system need to have resistance to repeated cycles of high and low temperatures shock without cracking. Generally, epoxy resin in combination with anhydride curing agents give good thermal shock resistant thermoset material as compared to those with polyamine curing agents. However, there is certain limitation for use of anhydride curing agent e.g. require elevated temperature for curing. Room temperature cured epoxy-polyamine based thermoset exhibit brittleness and thus a low resistance to thermal shock. Diluents and modifiers help for improving thermal shock resistance properties but, unfortunately, adversely influence the heat deflection properties (May and Tanaka, Epoxy Resins, New York, 1973, p. 299). Additionally, plasticizers have not found wide acceptance in epoxy technology primarily because they deteriorate other properties like glass transition temperature or hardness of the cured resins.

Mostly, thermal shock resistance epoxy based thermoset material is developed by adding additive in the epoxy resin composition or curing agent composition. In U.S. Pat. No. 4,122,068, thermal shock resistance properties is developed by adding polyether dicarbamate having terminal hydroxyalkyl carbamate groups in epoxy resin and anhydride curing agent. Polyether diureide having terminal ureido groups is added in epoxy resin and anhydride curing agent for improving thermal shock resistance epoxy system (U.S. Pat. No. 4,116,938). Acrylic polymer mixture is also used for the improving the thermal shock resistant epoxy based thermoset materials (U.S. Pat. No. 3,864,426). U.S. Pat. No. 4,837,295, described the use of polyoxyalkylene polyamines as a curing agent for epoxy resin to obtained thermal shock resistance material.

Thus, there is the need to have curing agents comprising amines, which result in materials resistant to thermal shock when reacted with a resin, in particular, with an epoxy resin.

These problems can be solved by the new compounds of the invention, in fact, these compounds, when used as curing agents allow to produce a cured composition resulting in a bright material or article. Adding to the curable composition a dye, a colored material or article can be obtained. Accordingly, the compounds of the invention allow to produce materials or articles available in wide range of colors.

Furthermore, the compounds of the invention have the inbuilt accelerating property, which allow the curing reaction to start and proceed, and simultaneously with the ability to control such reaction in terms of peak exotherm temperature, i.e., to have resin and hardener systems for which there is no need of adding accelerators Furthermore, the cured composition comprising the compound of the invention results in a material with excellent properties as compared to standard polyamide based hardener systems.

The cured composition comprising the compound of the invention results in a material which is semi rigid, flexible, bright, has a low peak exotherm temperature and it is resistant to high thermal shock and chemicals.

The compounds of the invention can be used for encapsulation. The cured composition can be applied in electrical and electronics devices and boards. The obtained cured product can be used in aqueous environments, such as for marine applications e.g. submergible pump application.

DETAILED DESCRIPTION OF THE INVENTION

The present invention relates to a compound comprising a substituted cardanol or a substituted bisphenol, or mixtures thereof, wherein the aromatic ring of the cardanol and/or of the bisphenol is substituted with at least two different groups each having at least one active hydrogen linked to an amine group and one group further comprising at least one ether group.

In a preferred embodiment of the compound of the invention, the group further comprising at least one ether group comprises a polyether segment.

In another preferred embodiment of the compound of the invention, the group having at least one active hydrogen linked to an amine group comprises a secondary amine.

In another preferred embodiment of the compounds of the invention, each group comprising at least one active hydrogen linked to an amine group further comprises a group selected from alkyl, aryl, heteroaryl, cycloalkyl and heterocycloalkyl. More preferably, the compounds of the invention further comprise a group selected from alkyl and heterocycloalkyl.

In another preferred embodiment, the compounds of the invention further comprise oxalic acid and/or salts thereof.

Since the compound and/or the composition of the invention contain amines, the oxalic acid in the composition or in the compound may generally be present as a salt.

The compounds of the invention used as curing agents allow to obtain bright materials, which can be colored by addition of a dye.

Oxalic acid has been found to be an effective bleaching agent for obtaining brighter phenalkamines, in particular using commercially available cardanol.

Accordingly, the presence of oxalic acid or its salts further improves the possibility to obtain colorable final materials.

The invention further relates to a curable composition comprising anyone of the compounds of the invention and an amine reactive resin.

The amine reactive resin of the curable composition might also react with —OH groups.

Preferably, the amine active resin is an epoxy resin. More preferably, the epoxy resin has on average at least one epoxy group per molecule, preferably at least one glycidyl group per molecule.

More preferred epoxy resins are those epoxy resins having 1.8 epoxy groups per molecule.

Commercially available epoxy resins are suitable for being cured with the compounds of the invention. Preferably, the commercially available epoxy resins suitable for the invention are based on bisphenol A, bisphenol F or mixtures thereof.

In a further preferred embodiment, the composition of the invention has a peak exotherm temperature of the composition in the range of 20° C. to 60° C., preferably, in the range of 55° C. to 25° C., more preferably in the range of 30° C. to 50° C.

In a preferred embodiment, the composition of the invention further comprises a dye or a fluorescent marker.

A dye is a colored substance that has an affinity to the substrate to which it is being applied. Dyes and pigments are colored, because they absorb only some wavelengths of visible light. Dyes are usually soluble in water whereas pigments are insoluble. Some dyes can be rendered insoluble with the addition of salt to produce a lake pigment.

Dye can be natural, synthetic, organic or inorganic based.

The dye is used as a coloring agent, meaning that the coloring effect is given to the final product obtained from resin and curing agent mixture.

Preferred dye of the inventions are blue dyes.

Accordingly, anyone of the compounds of the invention can be used in any curable composition in the described embodiments comprising an amine reactive resin.

In a further embodiment, the invention relates to the use of a compound of the invention for curing a composition comprising an amine reactive resin. Preferably an epoxy resin. More preferably the epoxy resin has on average at least one epoxy group per molecule, preferably at least one glycidyl group per molecule.

In a preferred embodiment, anyone of the compounds of the invention can be used in any curable composition in the described embodiments comprising an amine reactive resin.

In another embodiment, the invention relates to the use of the composition comprising the compound of the invention for potting electrical and electronic components or devices.

In another embodiment, the invention relates to the use of the compound of the invention in a composition for potting electrical and electronic components or devices.

In another embodiment, the invention relates to a process for preparing the compound of the invention comprising the step of reacting cardanol and/or bisphenol with at least one compound having a primary or secondary amine group and one compound having at least one primary or secondary amine group and further comprising an ether group in the presence of formaldehyde and a catalyst.

In another preferred embodiment, the primary and/or secondary amine group further comprises a group selected from alkyl, aryl, heteroaryl, cycloalkyl and heterocycloalkyl, preferably from alkyl and heterocycloalkyl.

In a preferred embodiment, the primary or secondary amine further comprises an ether group, preferably a polyether segment.

In a preferred embodiment, the primary or secondary amine further comprises an ether group is a polyetheramine.

In another preferred embodiment, the catalyst is an acid compound, preferably oxalic acid.

In a further embodiment, the invention relates to a process for preparing an article or a material, comprising the steps of:
a. mixing an epoxy resin having on average at least one epoxy resin per molecule, preferably at least one glycidyl group per molecule, with any compound of the invention;
b. curing the mixture of step a.

In a further embodiment, the invention relates to an article obtained by a process comprising the steps of:
a. mixing an epoxy resin having on average at least one epoxy resin per molecule, preferably at least one glycidyl group per molecule, with any compound of the invention;
b. curing the mixture of step a.

In a further embodiment, the invention relates to a material obtained by a process comprising the steps of:
a. mixing an epoxy resin having on average at least one epoxy resin per molecule, preferably at least one glycidyl group per molecule, with any compound of the invention;
b. curing the mixture of step a.

Preferred compounds having primary and/or secondary amine groups used in the process of the invention are aliphatic amines, cycloaliphatic amines, heterocyclic amines, aromatic amines.

Accordingly, the compound comprising at least a primary or a secondary amine may further comprise a group selected from alkyl, aryl, heteroaryl, cycloalkyl and heterocycloalkyl.

Preferably the compounds comprising at least a primary or a secondary amine are selected from the group consisting of N-aminoethylpiperazine; diethylenetriamine; triethylenetetramine (TETA); tetraethylenepentamine; 2-methylpentamethylene; 1,3-pentanediamine; trimethylhexamethylene diamine; a polyamide; a polyamidoamine and combination of thereoftrimethylolpropane tris[poly(propylene glycol), amine terminated] ether, 2-(1-piperazinyl)ethylamine, 3-aminomethyl-3,5,5-trimethylcyclohexylamine, 3,6,9,12-tetraazatetradecane-1,14-diamine, tetraethylenepentamine and triethylenetetramine, 3,6-diazoctanethylenediamine, 3,6,9-triazaundecamethylenediamine, 1,3-bis(aminomethyl) benzene, 1,3-bis(aminomethyl)cyclohexane, 5-diethyl toluene-2,4-diamine and 3,5-diethyl toluene-2,6-diamine (mixture of the two isomers), 2,2'-(ethylenedioxy)bis (ethylamine), 1,6-diamino-2,2,4(2,4,4)-trimethylhexane, N'-(3-aminopropyl)-N,N-dimethylpropane-1,3-diamine, 4,4'-diaminodicyclohexylmethane, 1,2-cyclohexanediamine and mixtures thereof.

Preferred compounds having at least a primary or a secondary amine group further comprising at least one ether group are polyetheramines. Preferred polyetheramines of the invention preferably comprise at least one oxyethylene diamine segment, oxyethylene triamine segment or polyoxyethylene diamine segment. Polyetheramines of the invention preferably comprise at least one propylene oxide segment, ethylene oxide segment or a mixture of both.

Preferred polyetheramine used in the present invention are commercially available under the trademark JEFFAMINE from Huntsman Corporation, Houston, Tex. such as, JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof. Preferred polyetheramines of the invention are JEFFAMINE® D-230.

Within the meaning of the invention, the terms curing agent and hardener have the same meaning.

Cured composition in this invention may further comprise inorganic and/or organic fillers. Suitable inorganic fillers include barium sulfate, silica, aluminum oxide, calcium oxide, magnesium oxide, sodium oxide, potassium oxide, iron oxide, titanium oxide, other oxides or mixtures thereof. Other suitable fillers include silica-gels, calcium silicates, calcium nitrate, calcium phosphates, calcium molybdates, calcium carbonate, calcium hydroxide, fumed silica, clays such as bentonite, aluminium trihydrates, magnesium dihydrates, glass microspheres, hollow glass microspheres, polymeric microspheres, and hollow polymeric microspheres. Organic fillers such as aramid fibers and polyolefin fibers such as polyethylene fibers can be used in the curable composition.

The curable composition can contain any suitable amount of the filler. It may contains 0.01 to 50 weight percent filler based on a total weight of the curable composition.

The compounds of the inventions can be used for curing a composition comprising an amine reactive resin, preferably an epoxy resin, more preferably, the epoxy resin has on average at least one epoxy resin per molecule, preferably at least one glycidyl group per molecule. Preferably, the compounds of the invention can be used in a composition further comprising a dye or a fluorescent marker.

The invention further relates to a process for preparing the compounds of the invention. The process comprises the steps of reacting the cardanol and/or bisphenol with at least one compound having at least one primary or secondary amine group and one compound having at least one primary or secondary amine group further comprising an ether group in the presence of formaldehyde and a catalyst.

The invention further relates to a process for preparing an article or material comprising the step of mixing an amine reactive resin, preferably an epoxy resin, with the compound of the invention and curing the mixture.

Preferably, the material or article prepared using the composition of the invention has a resistance to thermal shock of at least 10 thermal cycles passed at −20° C./+120° C. for one hour duration, preferably at least 15 thermal cycles passed at −20° C./+120° C. for one hour duration, more preferably at least 20 thermal cycles passed at −20° C./+120° C. for one hour duration.

Another object of the invention are the articles or materials produced by the process comprising the step of mixing an amine reactive resin with the compound of the invention and curing the mixture.

The present invention is explained in more details by the following non-limiting examples.

EXAMPLES

The phenalkamine of the invention were synthetized analogously to the synthesis procedure given in the U.S. Pat. No. 6,262,148 B1 and Journal of Polymer Science, Part A: Polymer Chemistry, Vol. 52, pp, 472-480, [2014], Wiley Periodicals, Inc.

Example 1

Preparation of Polyetheramine Modified Phenalkamine Using Bisphenol a as a Source of Phenolic Structure A three-liter reaction flask was charged with the following ingredients to prepare a polyetheramine modified phenalkamine based compound:
264.55 g Bisphenol A
1582.01 g Polyetheramine (Jeffamine D 230)
63.50 g Paraformaldehyde
88.62 g TETA (Triethylenetetramine)
2.00 g oxalic acid In a three liter reaction flask with a water cooled reflux condenser, 264.55 g bisphenol A, 1582.11 g polyetheramine and 88.62 g TETA were charged and stirred for 20 minutes. Afterwards, 63.50 g paraformaldehyde along with 2 g of oxalic acid were added in above mixture under stirring. After complete addition of above ingredient, the temperature was slowly increased to 120° C. under constant stirring for 2.5 hour. At this temperature, a clear mixture was obtained which indicated a complete reaction took place. The residual water present in mixture was removed by applying vacuum of 650 mm/Hg for 1 hours duration to the system.

Example 2

Preparation of Polyetheramine Modified Phenalkamine Using Cardanol as a Source of Phenolic Structure In three-liter reaction flask following ingredients were charged to prepare a polyetheramine modified phenalkamine based curing agent:
450.71 g Cardanol
1383.65 g Polyetheramine (Jeffamine D 230)
81.45 g Paraformaldehyde
81.45 g TETA (Triethylenetetramine)
2.00 g Oxalic acid (Catalyst)

All the above ingredients were charged in three liter reaction flask with a water cooled reflux condenser under continuous stirring and heated slowly to 120° C. maintaining the continuous stirring for the duration of 2.5 hours. After completion of reaction, the residual water present in mixture was removed by applying vacuum of 650 mm/Hg to the system for 1 hour.

Example 3

Preparation of Polyetheramine Modified Phenalkamine Using Bisphenol a and Cardanol as a Source of Phenolic Structure The below ingredient were added in three-liter reaction flask to prepare a polyetheramine modified phenalkamine based curing agent:
211.03 g Bisphenol A
211.03 g Cardanol
1295.70 g Polyetheramine (Jeffamine D 230)
127.12 g Paraformaldehyde
152.55 g TETA (Triethylenetetramine)
2.00 g Oxalic acid (Catalyst)

50:50 ratios of cardanol with bisphenol were charged in the three liter reaction flask along with other additives under continuous stirring and heated slowly to 120° C. with maintaining the continuous stirring for 2.5 hours duration. After completion of reaction, residual water present in mixture were removed by applying vacuum of 650 mm/Hg for 1 hour duration to the system.

Example 4—Comparative Example

Preparation of Unmodified Phenalkamine Based Curing Agent

The following ingredient were added in three liter reaction flask for preparation of unmodified phenalkamine based curing agent.
1206.70 g Cardanol
157.80 g Paraformaldehyde
621.30 g Aminoethyl piperazine
2.00 g Oxalic acid (catalyst)

Firstly, cardanol and paraformaldehyde were charged in three liter reaction flask with a water cooled reflux condenser under continuous stirring and heated slowly to 40° C. Aminoethyl piperazine was added under stirring along with oxalic acid in above mixture. This mixture was stirred at 120° C. for 2.5 hours. After completion of reaction, residual water present in mixture was removed by applying to the system vacuum of 650 mm/Hg for 1 hour.

Example 5

Preparation of Colored Polyetheramine Modified Phenalkamine

Different types of colored polyetheramine modified phenalkamine were developed for various applications.

The compound resulting in Example 1 was mixed with the quantity of blue dye summarized in Table 1.

Epoxy resin was cured with the mixture of compound obtained from Example 1 and blue dye. The colors of the resulting cured resins are also summarized in Table 1.

Example 6

Preparation of Cured Material by Using Color Polyetheramine Modified Phenalkamine with Epoxy Resin The above mixture are degases at 650 mm/Hg for 15 minutes duration. Poured this mixture in suitable container at room temperature for 3 hours to form a thermoset.

Example 7

Composition and process for the preparation of filled epoxy system.

The following ingredient were added in three kg container for preparation of filled epoxy system.
129 g Epoxy Resin (DGEBA)
143 g Epoxy Resin (Blend of DGEBA and DGEBF)
94 g Epoxy Diluent
0.5 g Black Dye (Coloring agent)
3 g Antiterra U (Wetting and dispersing additive)
2 g BYK W 969 (Wetting and dispersing additive)
2.5 g Hydrophilic Fumed Silica (Rheology and thixotropy controlling agent)
605 g Aluminum Hydrate (Inorganic Filler)
21 g Barium Sulphate (Inorganic Filler)

In a three KG capacity container, added Epoxy Resin (DGEBA), Epoxy Resin (Blend of DGEBA and DGEBF), Epoxy Diluent and Black Dye and stirred for 30 minutes at 65° C. Later on added Antiterra U, BYK W 969, Hydrophilic Fumed Silica under stirring at 65° C. Finally, added Aluminum Hydrate, Barium Sulphate and stirred the mixture for 130 minutes at 65° C. The above mixture is degased at 650 mm/Hg for 15 minutes duration.

TABLE 1

| Hardener | Epoxy Resin | Concentration of colored dye [ppm] | Color of the cured resin |
|---|---|---|---|
| Conventional polyamide | | 0 | Dark yellow |
| Unmodified Phenalkamine without oxalic acid | DGEBA (Diglycidyl Ether of Bisphenol A) | 0 | Dark Brown |
| Unmodified Phenalkamine of Example 4 | Mixing ratio of resin and hardener: 100:35 wt/wt | | Brown |
| Polyetheramine Modified Phenalkamine of Example 1 | | 500 | Dark blue |
| | | 100 | Bright blue |
| | | 10 | Bright yellow color |
| | | 0 | Very light yellow color |

Comparison of physical properties and final performance properties of polyetheramine modified phenalkamine as compared to unmodified phenalkamine.

TABLE 2

| Properties | Ex 4 | Ex 1 | Ex 2 | Ex 3 |
|---|---|---|---|---|
| Viscosity at 25° C. in cP | 2000 | 120 | 50 | 615 |
| Amine Value in mg KOH/g | 285 | 430 | 362 | 405 |
| Gel Time in Minutes (Mixing ratio of resin and hardener: 65:35) | 40 minutes without catalyst | 180 without accelerator | 182 without catalyst | 190 without accelerator and 110 minutes with accelerator |
| Final Performance Properties | | | | |
| Glass Transition Temp. (Tg) in ° C. | 60 | 74 | 75 | 77 |
| Hardness (Shore D) | 80 | 70 | 78 | 82 |

Table 2 shows that the material obtained using the compositions comprising polyetheramine modified phenalkamine have superior physical properties as compared to the material using the composition comprising unmodified phenalkamine curing agent. Generally, in potting application in electrical and electronics industry need longer gel time which help them for used the mixture and resin and hardener system for longer pot life.

Viscosity and amine value data of example number 3 shows the use of combination of cardanol and bisphenol A allows lower viscosity and higher amine value and yet providing longer pot life as compared to example 4.

Additionally, polyetheramine modified phenalkamine hardener system give characteristic properties to the final material such as lower viscosity, higher amine value, higher glass transition temperature and higher hardness value (shore D) as compared to the unmodified phenalkamine system.

TABLE 3

Thermal shock resistance data of materials obtained using the composition comprising polyetheramine modified phenalkamine of example 1 and materials obtained using the composition comprising unmodified phenalkamine

| Hardener | Epoxy Resin | Number of Thermal Cycle Passed (−20° C./+120° C.) for 1 Hour duration each |
|---|---|---|
| Unmodied phenalkamine of example 4 | Filled Epoxy Resin Mixing ratio of resin and hardener: 100:12 wt/wt | 6 |
| Polyetheramine Modified Phenalkamine of Example 1 | | 50 |
| Polyetheramine Modified Phenalkamine of Example 3 | | 22 |

The number of thermal cycle passed by thermoset prepared using polyetheramine modified phenalkamine curing agents with filled epoxy system is higher than the thermoset prepared from unmodified phenalkamine with filled epoxy resin (Table 3). This types advance properties of thermoset obtained due to the unique structure of hardener system.

TABLE 4

Comparison of peak exotherm temperature data of unmodified phenalkamine with polyetheramine modified phenalkamine:

| Type of Hardener Used | Type of Epoxy Resin Used | Peak Exotherm Temperature in ° C. |
|---|---|---|
| Unmodified Phenalkamine of Example 4 | Filled Epoxy Resin Mixing Ratio of Resin and Hardener: 100:12 wt/wt (224 g level) | 70 |
| Polyetheramine Modified Phenalkamine of Example 1 | | 30 |
| Polyetheramine Modified Phenalkamine of Example 3 | | 30 |

Peak exotherm temperature observed for the polyetheramine modified phenalkamine system is only 30° C., whereas unmodified phenalkamine system shows higher peak exotherm (70° C.). The ether linkage available in the polyetheramine modified phenalkamine system most probably helps for the low peak exotherm.

The value indicated as "g level" in the measurement of the peak exotherm temperature means the quantity of mass of the reaction mixture.

Methods

The properties summarized in the Tables above were measured applying the following methods.

(1) The viscosity was measured at a temperature of 25° C. [in cP] using a BROOKFIELD viscometer, spindle number 27 at share rate of 10 rpm.

(2) The Amine Value in mg KOH/g was measured using the following method.

Reagents:
 Glacial acetic acid
 Perchloric acid in glacial acetic acid 0.1 N standardised.
 Crystal violet indicator solution. (1.0 g crystal violet in 100 ml glacial acetic acid.)

Apparatus:
 Idometric flack—capacity 250 ml
 Graduated glass cylinder capacity 50 ml
 Burette—capacity 25 ml (min dev.0.1 ml)
 Precision balance.

Procedure:
 1. Weigh accurately 0.3-0.5 g sample in a clean & dry idometric flask.
 2. Dissolve in about 50 ml glacial acetic acid worm if necessary, cool to room temp.
 3. Titrate against standardised perchloric acid using crystal violet indicator solution till colour change from violet to green.
 4. Note the reading (R ml)

Calculation:

$$\text{Amine value} = \frac{56.1 \times N \times R}{\text{Weight of sample}}$$

N=Normality of perchloric acid
R=ml of perchloric acid required.

(3) The Gel Time was measured at a temperature of in Minutes (Mixing ratio of resin and hardener: 65:35) using gelation timer (TECHNE instrument).

(4) The Glass Transition Temperature (Tg/° C.)) was measured using the Metter Toledo at a rate of 10° C./min in air (25° C. to 600° C.).

(5) The Hardness (Shore D) was measured using the DUROMETER FROM HIROMETER at 25° C.

(6) The thermal shock cycles were performed using the CM Envirosystem, model Kinetic 25 B2 at −40/100° C. No. of Thermal Cycle Passed at −40/100° C. for 1 hour duration each without any visual cracks was reported above.

(7) Measurement of peak exotherm temperature was carried as below method.

Required amount of resin and hardener are weighed in a container and thoroughly mixed at 25° C. Then a thermometer is placed in the mixture of resin and hardener and the temperature is noted. The rise in temperature is measured at regular time interval. The rise in temperature is observed due to the reaction between epoxy groups of the resin and amine groups present in the hardener. When the reaction reaches gelation stage, mass becomes very viscous and no further rise in temperature is observed as the reaction rate is reduced and consequently a decline of temperature starts. The maximum temperature observed is noted as the peak exotherm temperature of the system.

The invention claimed is:

1. A curable potting composition consisting essentially of:
 one or more of a substituted cardanol and a substituted bisphenol, wherein the one or more of a substituted cardanol and a substituted bisphenol includes an aromatic ring substituted with at least two different groups each comprising at least one active hydrogen linked to an amine group, and a group of the at least two different groups further comprises at least one ether group;
 one or more of oxalic acid and a salt of oxalic acid; and an amine reactive resin.

2. The curable potting composition of claim 1, wherein the group further comprising at least one ether group comprises a polyether segment.

3. The curable potting composition of claim 1, wherein a group of the at least two different groups comprises a secondary amine.

4. The curable potting composition of claim 1, wherein each group comprising at least one active hydrogen linked to an amine group further comprises an alkyl group, an aryl group, an heteroaryl group, a cycloalkyl group, or a heterocycloalkyl group.

5. The curable potting composition of claim 1, wherein the amine reactive resin is an epoxy resin.

6. The curable potting composition of claim 1, further comprising a dye or a fluorescent marker.

7. The curable potting composition of claim 1, wherein the composition has a peak exotherm temperature in the range of 20° C. to 60° C.

8. A process for preparing an article or a material, the process comprising:
 forming the curable potting composition of claim 1; and
 curing the curable potting composition.

9. A material obtained by the process of claim 8.

10. A process for preparing an article or a material, the process comprising:
 curing the curable composition of claim 1.

11. A material obtained by the process of claim 10.

12. An electrical device comprising a potted component including a cured form of the curable composition of claim 1.

13. An electronic device comprising a potted component including a cured form of the curable composition of claim 1.

14. The curable potting composition of claim 1, wherein at least one of the groups does not comprise an ether group.

15. A curable potting composition according to claim 1, further comprising a coloring agent.

* * * * *